United States Patent [19]

Hansen

[11] Patent Number: 4,614,184

[45] Date of Patent: Sep. 30, 1986

[54] SINGLE SOLENOID CONTROL OF SEQUENTIAL MULTIPLE ACTUATORS

[75] Inventor: Kent G. Hansen, Chatham, Canada

[73] Assignee: Canadian Fram Limited, Chatham, Canada

[21] Appl. No.: 623,816

[22] Filed: Jun. 22, 1984

[51] Int. Cl.$^4$ .............................................. F02M 25/06
[52] U.S. Cl. .................................... 123/571; 123/587; 60/289
[58] Field of Search ................ 123/568, 569, 571, 587; 60/278, 274, 289, 276

[56] References Cited

U.S. PATENT DOCUMENTS

| 4,281,631 | 8/1981 | Yamaguchi | 123/571 |
| 4,300,516 | 11/1981 | Hayakawa | 123/568 X |
| 4,313,415 | 2/1982 | Shinzawa | 123/571 X |
| 4,335,699 | 6/1982 | Totsune et al. | 123/587 X |
| 4,483,308 | 11/1984 | Hasegawa | 123/571 |

Primary Examiner—Willis R. Wolfe, Jr.
Attorney, Agent, or Firm—Markell Seitzman; Russel C. Wells

[57] ABSTRACT

A flow control system (10) responsive to fluid pressure comprising means (12, 20) for varying the magnitude of said pressure within a plurality of different pressure ranges; a plurality of pressure responsive valves (30, 32) communicated with said pressure means, each valve having at least two operative conditions; means (40, 42, 44, 46, 52, 54, 56, 58) for sequentially changing the operative condition of a particular one of said plurality of pressure responsive valves in response to changes in the magnitude of pressure communicated thereto.

13 Claims, 2 Drawing Figures

SINGLE SOLENOID CONTROL OF SEQUENTIAL MULTIPLE ACTUATORS

BACKGROUND AND SUMMARY OF THE INVENTION

The present invention relates to a system for controlling the sequential operation of a plurality of air control valves and more particularly finds application in controlling the functions of exhaust gas recirculation and idle speed bypass for an internal combustion engine as well as within an automotive three-way catalyst secondary air control system.

Modern automobile engines must usually be maintained at sufficiently low engine speeds in order to lessen the amount of pollutants given off by the engine while it is idling. The idle speed bypass valve (idle air bypass valve or bypass valve) is utilized to set the engine idle speed as a function of the load on the engine. As is known, when vehicle accessories are switched on with the engine in an idling condition, the engine may stall. An example of idle speed bypass valves is illustrated in U.S. Pat. No. 4,388,856 which illustrates a pneumatic device which controls the positioning of a plunger which in turn is used to vary the position of the throttle mechanism to readjust the engine idle speed as a function of engine load.

In order to reduce exhaust gas emissions when the engine is off-idle, an exhaust gas recirculation valve has typically has been used to recirculate a determinable percentage of the exhaust gas within an exhaust system of the engine into the intake manifold.

The controlling of engine idle speed and EGR recirculation conventionally utilized two separate and independent mechanisms to control these separate and independent functions. A modification of these earlier systems is shown by Yamaguchi in U.S. Pat. No. 4,281,631 which uses a single solenoid valve but still requires an electrically responsive changeover valve.

It is an object of the present invention to provide a system employing a single vacuum regulating device to selectively control the vacuum applied to a plurality of air control devices.

A further object of the present invention is to utilize a single vacuum regulating device to control the operation of an exhaust gas recirculation (EGR) valve and an idle speed bypass valve.

As can be seen from the discussion below the present invention has application to another type of exhaust control device which is conventionally referred to as a three-way catalyst secondary air control system. These systems classically utilize a dump valve for dumping the output of an air pump either to atmosphere or to another pneumatic valve commonly referred to as a switch valve which channels the air pump flow either mid-bed of the catalytic converter or to its entrance. The dump valve and switch valve have characteristically been controlled by separate solenoid switches in a manner having commonality with the control of the above-mentioned EGR-idle speed control systems. It is therefore a further object of the present invention to utilize a single vacuum regulating device to control the operation of a dump valve and a switch valve for application within a three-way catalyst secondary air control system.

It is a further object of the present invention to provide a system for combined control of the above-identified valves which exhibits simple construction and efficient operation.

Accordingly the invention comprises a flow control system responsive to fluid pressure comprising means for varying the magnitude of the pressure within a plurality of different pressure ranges; a plurality of pressure responsive valves communicated with said pressure means, each valve having at least two operative conditions and means for sequentially changing the operative condition of a particular one of the plurality of pressure responsive valves in response to changes in the magnitude of pressure communicated thereto.

Many other objects and purposes of the invention will be clear from the detailed description of the drawings.

DETAILED DESCRIPTION OF THE DRAWINGS

Figure 1:
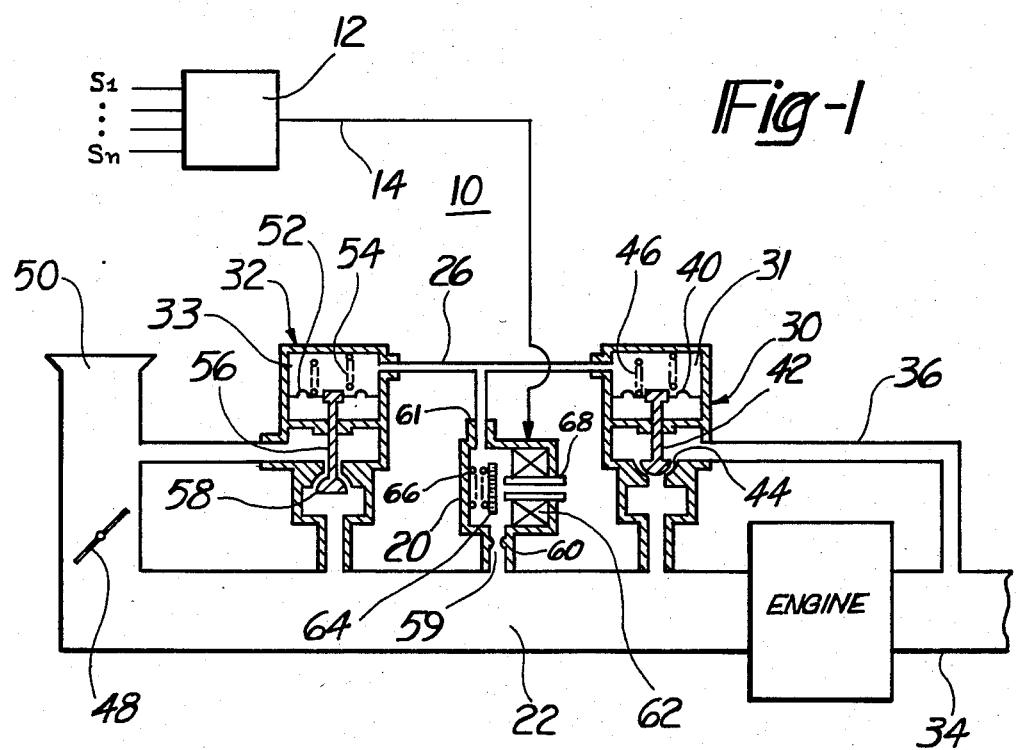
FIG. 1 illustrates an exhaust gas recirculation-idle speed bypass control system.

The system 10 comprises a vehicle computer 12 of known variety adapted to receive a plurality of sensor inputs generally designated as S1 ... SN. Such signals may include throttle position, manifold absolute pressure, temperature, engine RPM, etc. The output of the vehicle computer 12, generally designated as line 14, is connected to a vacuum responsive solenoid valve 20 such as an electric vacuum regulator which is connected to the intake manifold 22 of an engine. The output of the valve 20 is connected through a t-connection 26 to a plurality of air control valves. More specifically the t-connection 26, as illustrated in FIG. 1, is connected to the vaccum chambers 31 and 33 of an EGR valve 30 and an idle speed bypass valve 32. The EGR valve 30 may be of known construction and designed to pass a controlled amount of exhaust gas from the exhaust pipe 34 through an exhaust conduit 36 and into the intake manifold 22 of the engine. The EGR valve 30 further includes a spring loaded diaphragm 40 supporting a movable piston 42 which controllably moves relative to a valve seat 44. The diaphragm 40 is biased downwardly as viewed in the drawing by a spring 46.

The idle speed bypass valve 32 functions to divert a controlled amount of clean air about a movable throttle plate 48. More particularly, the idle speed bypass valve 32 diverts air from an air inlet 50 into the intake manifold 22. The valve 32 comprises a spring loaded diaphragm 52 biased downwardly as viewed in the drawing by spring 54. The diaphragm 52 similarly controls the position of a movable piston 56 relative to its seat 58.

The valve 20 comprises a vacuum input port 59 communicated to a source of vacuum, such as the intake manifold 22, through a control orifice 60. The valve 20 includes an output port 61 communicated to the t-connection generally designated as 26. The solenoid valve 20 further includes an electric coil 62 positioned apart from a spring loaded plate 64 which is urged from sealing engagement by the force of vacuum with a seat 66 which is formed by the inwardly extending end of a vent tube 68 having its other end exposed to atmosphere. In operation, the vehicle computer 12 modulates the position of the plate 64 relative to the seat 66 to bleed the requisite amount of atmospheric air into the valve 20. The resultant vacuum pressure is simultaneously communicated to the EGR valve 30 and the idle speed bypass valve 32.

It is the purpose of the present invention to sequentially control a plurality of air valves (30, 32) with a single electrically responsive vacuum valve 20. This is accomplished in cooperation with the springs 46 and 54 which bias the diaphragms 40 and 52. As an example by choosing spring rate of spring 54 of the idle speed bypass valve 32 such that its movable piston 56 completes its travel when a vacuum pressure (within a determinable first pressure range such as between 1"Hg (2.54 mm) and 3"Hg (7.62 mm)) is applied to the vacuum chamber 31. Further, the spring rate of spring 46 of the EGR valve is chosen to effectively create a pressure dead-zone equal to or slightly greater than this first pressure range. By so choosing the spring rate of spring 46, the piston 42 is urged against its seat 44 and will only respond to a greater pressure such as that within a second pressure range such as between 4"Hg (10.16 mm) and 6"Hg (15.24 mm). In this manner it is possible to independently control both valves in a sequential manner by controlling the magnitude of a pressure simultaneously communicated thereto.

As a further example, the vehicle computer 12 commanding a pressure level within the first pressure range will cause the valve 20 to communicate a relatively low level of vacuum pressure to both valves. Because of the higher spring rate of the spring 46, the EGR valve 30 will remain closed. The idle speed bypass valve 32, however, can be modulated in response to the varying vacuum pressures established by the valve 20. It being presumed this varying vacuum pressure will remain in the first pressure range. During those instances when it is required to operate the EGR valve 30, the vehicle computer 12 will require the valve 20 to establish a greater level of vacuum such as a vacuum pressure modulated within the second pressure range. With this increased vacuum pressure again simultaneously applied to both valves, the idle speed bypass valve 32, due to this increased level of vacuum applied to its diaphragm 52, will cause its piston 56 to remain seated on its corresponding seat 58 thus inhibiting the further bypass of air around the throttle plate 48. In this operating condition the computer 12 permits the valve 20 to modulate the position of the piston 42 to effectively vary the amount of exhaust gases permitted to recirculate into the intake manifold 22 of the engine.

Figure 2:
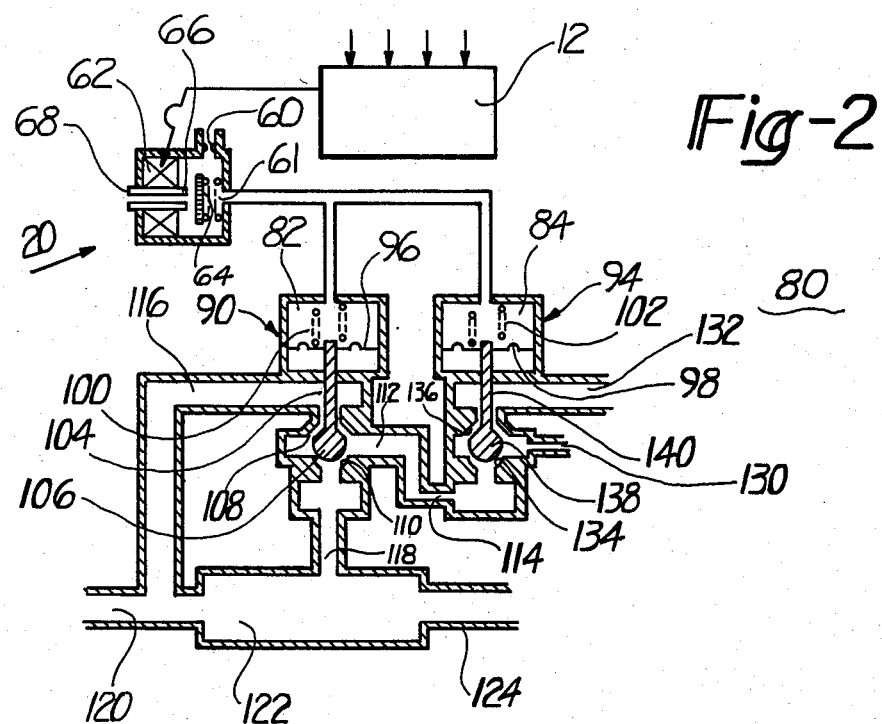
FIG. 2 illustrates an alternate embodiment of the invention showing a three-way catalyst secondary air control system employing the teachings of the present invention.

Reference is now made to FIG. 2 which illustrates a three-way catalyst secondary air control system 80 which is structurally similar to the embodiment of the invention illustrated in FIG. 1 in that it utilizes a single analog solenoid valve 20 to control the operation of a plurality of air control valves. More specifically, FIG. 2 illustrates an air control system 80 comprising the solenoid valve 20 which is adapted to receive signals from a vehicle computer 12 in a manner as described above. The output of the valve 20 is communicated to the inputs or vacuum chambers 82 an 84, respectively, of a switch valve 90 and a dump valve 94 of a known variety. The valves 90 and 94 each comprises a flexible diaphragm 96 and 98 which are biased by respective springs 100 and 102. The switch valve 90 comprises a piston 104 terminating in a valve element 106 capable of selectively seating upon either of two valve seats 108 and 110. The valve 90 further includes another input port 112 communicated to the output port 114 of the dump valve 94 and further includes a plurality of outputs or outflow passages or ports 116 and 118. The outflow passage 116 is communicated to the exhaust pipe 120 just upstream of the catalytic converter 122 while the outflow passage 118 is communicated midbed of the catalytic converter in a conventional manner as often used with three-way catalytic converters. The exhaust end of the catalytic converter is exposed to atmosphere through the remaining components of the exhaust system 124.

The dump valve 94 is of similar construction to that of the switch valve 90 and further includes an inlet port 130 adapted to receive the output of an air pump (not shown), a second outlet 132 communicated to atmosphere. The dump valve 94 further defines a plurality of valve seats 134 and 136 which are selectively closed by a valve element 138 which is moved by a piston 140.

In operation the system of FIG. 2 is designed to operate within three distinct pressure ranges. The initiation of movement of the pistons 104 and 140 of the above-noted valves will vary with the selected spring rate. As an example, without vacuum pressure applied to the pressure chambers 82 and 84, the pistons 104 and 140 will be biased downwardly as viewed in the figure against the valve seats 110 and 134, respectively. In this manner, the input air received at port 130 is dumped to atmosphere via the outlet port 132 of the dump valve 94. As the vacuum is increased, as an example, to perhaps 3 1/2"Hg(8.89 mm), the piston 140 will move upwardly to seat upon valve seat 136 thereby permitting the air pump to be connected to the input port 112 of the switch valve 90. It should be recalled that the level of vacuum generated by the valve 20 is communicated simultaneously to both valves 90 and 94. Consequently, during this condition wherein a midrange level of vacuum is communicated to the vacuum chambers of these valves, the piston 104 is still urged downwardly by action of the spring 100 thus permitting the air pump to be connected via the outlet passage 116 to the input of the catalytic converter 122. As the vehicle computer 12 requires the valve 20 to generate a larger vacuum signal, such as 7"Hg(17.78 mm), which is of a sufficient level to cause the diaphragm 96 to overcome the bias force exerted by spring 100, the piston 104 is moved upwardly to seat upon valve seat 108 thus dumping the air pump output through passage 118 mid-bed the catalytic converter 122. Thus as described above a single vacuum responsive solenoid switch again is utilized to control the operation of a plurality of vacuum responsive valves.

Many changes and modifications in the above-described embodiment of the invention can, of course, be carried out without departing from the scope thereof. Accordingly, that scope is intended to be limited only by the scope of the appended claims.

What is claimed is:

1. A system for controlling a plurality of vacuum responsive valves comprising:
   a normally open first valve;
   a normally closed second valve;
   means for generating a variable vacuum signal to said valves, and for simultateously communicating same to said valves, said generating means including means for establishing a first and a second vacuum pressure range and means for varying said vacuum signal within said first and second pressure ranges;

said first valve comprising:
a variable volume first chamber connected to said generating means, one extreme of said first chamber defined by a flexible diaphragm, a first spring for biasing said diaphragm in a manner to urge said valve toward an open condition, and wherein said vacuum pressure is operative to move said diaphragm in a manner to controllably urge said first valve toward its closed condition; the spring constant of said first spring of a magnitude such that when said vacuum pressure is within said second pressure range said first valve is maintained in its closed condition by virtue of the vacuum forces acting of said diaphragm and when said vacuum pressure is within said first pressure range, said first valve is operatively moved in varying degrees between its open and closed positions;

said second valve comprising:
a variable volume second chamber connected to said generating means, one extreme thereof defined by a flexible diaphragm, a second spring for biasing said diaphragm in a manner to urge said second valve toward a closed condition, and wherein said vacuum pressure is operative to move said diaphragm in a manner to controllably urge said second valve toward its said open condition, the spring constant of said second spring of a magnitude such that when said vacuum pressure is within said first pressure range said second valve is maintained its closed condition and when said vacuum pressure is within said second range said vacuum pressure is operative to urge said second valve towards its open condition.

2. The system as defined in claim 1 wherein said first pressure range is substantially between 1 Hg. and 3 Hg. and wherein said second pressure range is between 4 Hg. and 6 Hg.

3. A flow control system responsive to vacuum pressure, comprising:
a plurality of vacuum responsive valves comprising a normally first open valve operative to be urged toward a closed condition in response to vacuum pressure within a first predetermined range and a normally closed second valve operative to be urged towards an open condition in response to vacuum pressure within a second predetermined range;
means for generating a vacuum pressure signal and for simultaneously communicating same connected to said first and said second valves, said pressure signal variable within said first and second pressure ranges thereby regulating the degree of opening of said first valve and the degree of closing of said second valve;
said first valve comprising a first spring, located within a pressure chamber thereof for biasing a first diaphragm toward said open condition and wherein the vacuum pressure within said first pressure chamber is operative to urge said first valve towards a closed condition;
said second valve comprising a second spring for biasing a second disphragm located within a second pressure chamber thereof for urging said valve toward a closed condition and wherein the vacuum pressure within said second pressure chamber is operative to urge said second valve towards an open condition,
wherein when said vacuum pressure signal, simultaneously communicated to said first and said second pressure chambers is within said first pressure range, the spring force generated by said first spring biasing said second diaphragm is sufficient to maintain said second valve in its closed condition.

4. The system as defined in claim 3 wherein during instances when said vacuum pressure signal is within said second pressure range the force generated by said vacuum pressure is sufficient to overcome the force generated by said first spring to maintain said normally open valve in its closed condition while controllably urging said second valve towards its open condition.

5. The system as defined in claim 4 wherein said generating means includes means for varying said vacuum pressure signal through various values within said first and said second pressure ranges.

6. The system as defined in claim 5 wherein said second pressure range is greater than said first pressure range.

7. A flow control system responsive to fluid pressure comprising:
means for varying the magnitude of said pressure within a plurality of pressure ranges;
a plurality of pressure responsive valves communicated with said pressure means and adapted to simultaneously receive said pressure, each said valve having at least two operative conditions, said valves including;
means responsive to a particular pressure range for sequentially changing the operative condition of a particular one of said valves in response to changes in the magnitude of pressure communicated thereto;
wherein said sequential means comprises:
variable volume pressure chamber one associated with each of said valves, defined by a flexible diaphragm and wherein each one of said valves further includes means for biasing its respective diaphragm in a manner to place said valve in one of its operative conditions and wherein said biasing means is operative to permit only one of said valves to change its operative condition at any particular instant as the pressure is varied through said pressure ranges.

8. The system as defined in claim 7 wherein said pressure is vacuum pressure and wherein said plurality of pressure responsive valves includes a plurality of vacuum pressure valves.

9. The system as defined in claim 7 wherein said plurality of valves includes an EGR valve and an idle speed bypass valve.

10. The system as defined in claim 7 wherein said plurality of valves includes a dump valve and a switch valve.

11. The system as defined in claim 7 wherein said biasing means includes a spring associated with each of said vacuum pressure valves and positioned within a corresponding pressure chamber, an wherein the spring constant of each spring is associated with a particular one of said pressure ranges.

12. The system as defined in claim 7 wherein said varying means comprises a single electric vacuum regulator valve having an output port communicated to each said pressure chamber.

13. The system as defined in claim 12 wherein said dump valve includes an input port and first outlet port communicated to atmosphere, a second outlet port, a plurality of valve seats and a piston movably situated relative to valve seats to close off one or the other of said outlet ports in response to a pressure signal communicated thereto, and wherein said switch valve includes an inlet port communicated to said second outlet port of said dump valve, a first outlet port, a second outlet port and a piston movably situated relative to valve seats to close off one or the other of said switch valve outlet ports.

* * * * *